June 21, 1960
M. V. KALFAIAN
2,942,169
SYSTEM OF CHARGING AND DISCHARGING
A CAPACITOR AT HIGH SPEEDS
Filed Oct. 17, 1958
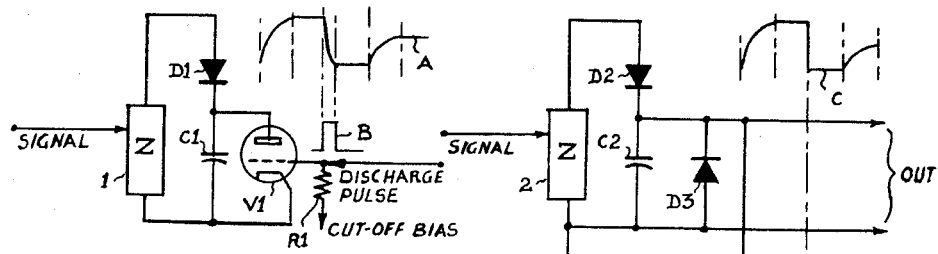
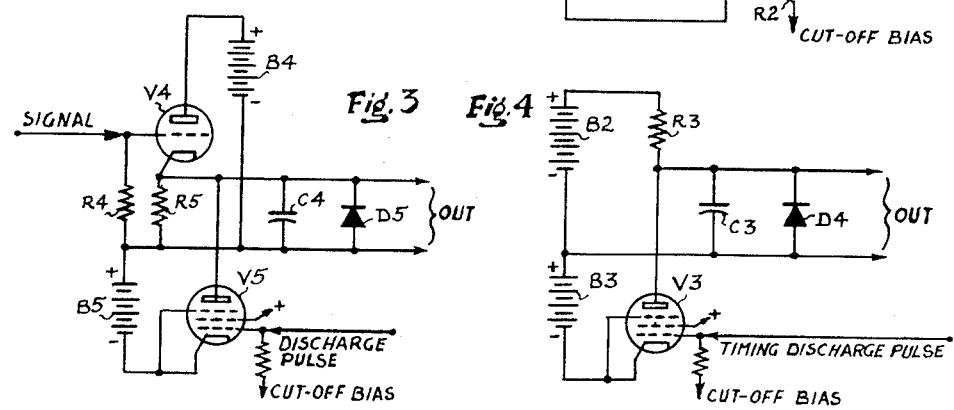
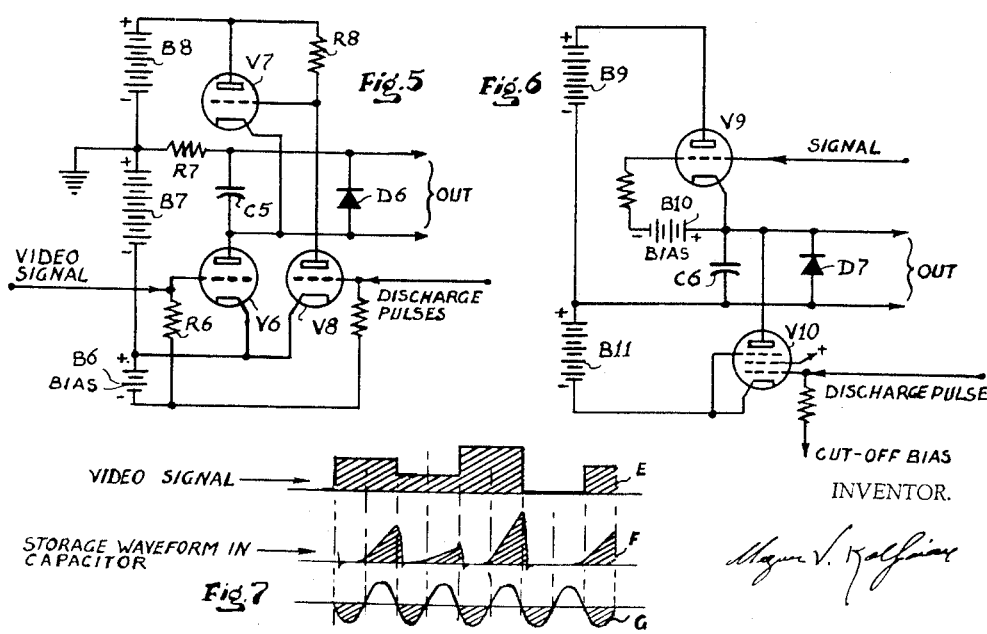
INVENTOR.
Magne V. Kalfaian United States Patent Office
2,942,169
Patented June 21, 1960

2,942,169

SYSTEM OF CHARGING AND DISCHARGING A CAPACITOR AT HIGH SPEEDS

Meguer V. Kalfaian, 962 Hyperion Ave., Los Angeles, Calif.

Filed Oct. 17, 1958, Ser. No. 767,896

2 Claims. (Cl. 320—1)

This invention relates to a system of charging and discharging a capacitor, and more particularly to the provision of a system for rapidly charging and discharging a low impedance capacitor according to a high frequency signal wave, as controlled by a high impedance signal source.

Some of the exemplary forms of charging and discharging a capacitor in electronic applications may be given, as follows: Charging a capacitor to a signal level and storing the charge for a given time period before discharging it fast; charging a capacitor slowly during a given time period and discharging it fast; and varying a high frequency complex signal potential across a large capacitor, the latter of which requires a very low impedance signal source; etc. The means usually utilized for discharging the capacitor is either a parallel connected resistor, or an electron tube; disregarding for the moment the use of transistors. The resistor utilized will effect a fast decay of the stored charge at the beginning of discharging it, and gradually sloping to lengthen the time of discharge. Also, when the capacitor is of large size, either so desired for a particular use, or inherently inevitable, the resistor should be of small value to effect the required speed of discharging it. Such values of the component parts necessitate the use of a low impedance signal source, and this often becomes prohibitively impractical. In the case where an electron tube is used across the capacitor to discharge it during some fly-back pulse period, the current passing through the tube is initially high when the potential across the capacitor is high, but as this potential decays, the current through the tube diminishes gradually and offers higher and higher impedance to the capacitor for its discharge. Thus it is seen that the arrangements used so far for discharging a capacitor lack the speed most often required in electronic applications. Accordingly, the main object of the present invention is to provide a simple and inexpensive arrangement for varying the charge across a low impedance capacitor at high frequency rate, under control of a high impedance signal source. Another object of the present invention is to amplify a high frequency signal across a low impedance capacitor under control of a high impedance high frequency signal source. The function of such arrangements will become apparent from the following description of the preferred embodiments of the invention, when considered in conjunction with the accompanying drawings, wherein:

Fig. 1 is an arrangement showing conventional mode of charging and discharging a capacitor.

Fig. 2 is an improved arrangement of charging and discharging a capacitor, according to the invention.

Fig. 3 is a modification of the arrangement given in Fig. 2.

Fig. 4 is a modification of Fig. 2, utilized as a time base generator.

Figs. 5 and 6 are modifications of Fig. 2, which may be utilized for varying video signal voltages across a large capacitor under control of a high impedance video signal source, and also utilized as an amplifier of said signals, according to the invention, and in Fig. 7 are waveforms showing the relation between original signal and stored signal in the capacitor.

Referring now to the detailed specification of the invention, Fig. 1 shows a conventional arrangement for charging and discharging a capacitor according to some incoming signals. The signal produced in block 1 is rectified through diode D1 and charged across capacitor C1. The discharger tube V1 is connected in parallel with the capacitor C1, but the control grid of V1 is highly negative biased through resistor R1, so as to render V1 normally inoperative and isolated from C1. Thus the capacitor C1 in its normally high Q state charges to the peak incoming signal, and retains this charge for a long time. When it is desired to discharge this stored quantity, or to shift it to a lower peak value during a short pulse time period, a short positive pulse is applied to the control grid of V1, driving it to a conductive state, and thereby discharging the capacitor C1 for a new charge of different peak value. Here it will be observed that when the stored potential across C1 is high, the conductivity of V1 will be high, and thereby effect fast discharge of C1. But as the voltage across C1 decreases to a very low value, the current passing through V1 also decreases to a very low value, with the net result that the voltage decay across capacitor C1 becomes exponential, such as shown by the graph at A. This exponential decay prevents fast shifting of the maximum stored signal to minimum signal, and accordingly, the positive pulse at B, as applied upon the control grid of V1, must be lengthened, as shown in the drawing.

From the specified function of the arrangement given in Fig. 1, it becomes obvious that an electron tube having the characteristics of high intensity current during the entire discharge period could provide the desired speed of capacitor discharge. Such high intensity constant current admittance is provided by the arrangement of Fig. 2, as embodied in the present invention. In Fig. 2, the capacitor C2 is charged in series with the rectifier D2, to the peak signal potential as supplied by the block 2. The discharger electron tube V2 is connected across capacitor C2, but in this case, in series with the high voltage supply source B1. The control grid of discharger tube V2 is highly negative biased through resistor R2, so as to render it normally inoperative, and thereby offer high impedance to the capacitor C2. When discharge of the capacitor C2 is desired, a short positive pulse, such as shown by the graph at D, is applied upon the control grid of V2, rendering it conductive. At this point, it will be noted that the anode of V2 sees the positive potential stored in capacitor C2, plus the positive potential of B1. No matter how low the voltage across C2 may be, the anode of V2 still sees the high potential of B2. Accordingly, the electron tube V2 starts with high current admittance, and ends with high current admittance at the point where C2 starts charging in reverse polarity through the series circuit of V2 and B1. Thus, a very narrow pulse, such as shown by the graph at D, is necessary to accomplish complete discharge of the stored quantity in C2. By choosing the electron tube V2 as a high admittance pentode, fast discharge of a large capacitor C2 may be easily achieved; a feat which normally would be impossible by the choice of similar component parts.

Continuing with the arrangement of Fig. 2, it will be observed that during the short pulse time, such as by the pulse shown at D, the capacitor C2 not only discharges fully, but also starts charging in reversed polarity. While such a condition may not be objectionable in certain applications, a simple remedy may be effected by the addition of a high admittance diode D3. This diode is so polarized across C2, that, current does not pass through diode D3 during signal charge across capacitor C2. When the voltage across C2 is reversed, however, current starts flowing through diode D3, and further current passing through V2 is experienced in series with the diode D3; instead of V2. After the pulse at D has ceased to zero value, any reverse voltage that may have been stored in capacitor C2 is quickly dissipated by the diode D3. Diodes having the characteristics of high conductance at very low forward voltages have been manufactured commercially, and accordingly, the arrangement of Fig. 2 has been found workable and very practicable in laboratory tests. The waveform, as shown at C, indicates that a voltage decay across capacitor C2 may be achieved almost in a straight line, by the proper choice of electron discharger tube.

Another arrangement that may be useful in various electronic applications is shown in Fig. 4. In this arrangement, the capacitor C3 is charged in series with resistor R3, across potential supply source B2. The voltage rise across capacitor C3 is practically linear during about 60% of the maximum charge, the latter of which is equal to the potential of B2. The linear portion of the voltage rise across C3 may be utilized as a saw tooth scanning time base, for example, in cathode ray scanning systems, and short interruption pulses at desired time intervals may be applied upon the normally idle discharger tube V3. The diode D4 and the voltage supply B3 are utilized in the same manner, as described by way of the arrangement given in Fig. 2. The circuit arrangement of Fig. 4 may also be adapted to the practice of translating time modulations into amplitude variations, for example, by controlling the time intervals of the arrivals of discharging pulses upon the control grid of V3.

A further modification of Fig. 2 is shown in Fig. 3, wherein, the original signals across high impedance load resistor R4 are applied upon the control grid of cathode follower tube V4. The capacitor C4 is charged according to the original signal in a rising direction across cathode circuit resistor R5, which also is of high impedance. The downward going input signals, in this case, are effected across capacitor C4 by discharging it periodically by the discharger tube V5. When high resolution of the corresponding charge in C4 is desired, a high frequency repetition of positive pulses may be applied upon the control grid of V5. The high frequency voltage interruptions across C4 may then be filtered out in a later stage. The rectifier diode D5 serves the same purpose, as described by way of the arrangement given in Figs. 2 and 4. Also, the plate voltage supply of cathode follower tube V4 is delivered by B4, and the capacitor C4 is discharged in series with V5 and plate voltage supply B5.

The number of useful applications and modifications of the basic circuit arrangement as given in Fig. 2 are too numerous to be included in the present disclosure, and accordingly, it is wished to be understood herein that numerous substitutions of parts, adaptations and modifications are possible without departing from the spirit and scope of the invention. One application that is worth mentioning here, and considered as a preferred embodiment of the invention, however, is the use of the arrangement as an amplifier of small signals arriving from a high impedance source, in a large capacitor, without the use of conventional amplifying means. In various applications, a voltage charge is either desired to be stored in a large capacitor, or that the capacitor is inherently and undesirably large. The time period in which the large capacitor may be charged depends upon the impedance of the signal source, and the very low impedance required for the signal source often becomes prohibitive. Accordingly, it is contemplated herein, to provide an arrangement for varying large potentials across a large capacitor at high frequencies, under control of a low amplitude high impedance and high frequency signal source. Such an arrangement is shown in Fig. 5.

In Fig. 5, the video signal across high impedance load resistor R6 is applied upon the control grid of V6, which is biased to normal current flow by the bias source B6. The capacitor C5 charges in series with tube V6 and plate voltage supply source B7. By neglecting the series connected resistor R7, which may be eliminated completely, if so desired, the time period during which the capacitor C5 will charge to the maximum potential of B7 depends upon the internal resistance of tube V6. Since this internal resistance of V6 can be controlled by the signal voltage applied upon its current intensity control grid, it is then obvious that the charging period of capacitor C5 can be controlled by the video signals applied to said control grid. Also, since the charge in C5 is unidirectional, as provided in the arrangement of Fig. 5, the problem is then to discharge the capacity C5 at a constant high frequency repetition rate. This discharge is effected by the discharge tube V7, which forms a closed circuit current flowing loop in series with C5 and supply voltage B8. In this arrangement, however, the control grid of V7 is at high voltage point, so the normal current-cut-off negative bias voltage upon said grid is obtained from across R8, by a normal current flow through it in series with normally conducting driver tube V8. The normal plate current flow of tube V8 is so adjusted that, the negative voltage drop across resistor R8 is much lower than the maximum negative voltage that is allowed to be stored in C5 with respect to the potential of B7, so that the grid of V7 is highly negative with respect to its cathode for full plate current-cut-off condition. When a pentode is used for V8, high anode conduction can be obtained with very low anode voltage, thereby allowing higher voltage storage in capacitor C5. Thus, with the arrangement, as given in Fig. 5, the charging time period of C5 can be controlled by the video signal applied to the control grid of V6, and a fast discharge of V6 can be effected by a narrow negative pulse applied upon the control grid of V8; the latter tube becoming non-conductive and the discharger tube V7 becoming conductive during the pulse period. The diode D6 serves the same function as described by way of the previous arrangements.

Fig. 7 shows the waveform relation between the original video signals, and the representative voltage charges stored across capacitor C5. The waveform at E, in shaded area, represents the original video signals, and the waveform shown at F, in shaded area, represents the voltage quantities stored in capacitor C5. The polarity of waveform at F is shown, as seen from anode to cathode terminals of diode D6. The frequency of interruption wave at G, which may be in the form of sine wave for ease of production, is adjusted, for example, at twice the highest video frequency, and its amplitude so adjusted that, the tube V8 is cut-off during part of the lower half of each succeeding cycle, as shown by the shaded areas.

Referring to the waveform of F, it is seen that during the off-current period of V7 the capacitor C5 charges linearly at a speed depending upon the instantaneous amplitude of signal voltage applied upon control grid of of V6. When conduction of V7 starts, the charge across capacitor C5 drops suddenly; the wave shape and the time period during which this drop is effected depending upon the conduction curvature of V7. When capacitor C5 is completely discharged, it remains in this discharged state until the tube V7 is again inoperative, at which time the capacitor starts charging linearly to an amplified amplitude corresponding proportionally to the incoming video signal. The amplification factor of the circuit arrangement of Fig. 5 can be varied by the magnitude of supply potential B7. The magnitude of supply potential B8 is not critical, and any potential that will provide sufficient conductivity of discharger tube V7 will satisfy. It will be noted that limitless amount of signal magnification can be obtained from the single stage, as shown in Fig. 5, by using a high potential source B7, limited only by performance characteristics of the electron tubes available. By the use of a pentode tube for V6, constant current for charging capacitor C5 may be obtained.

Fig. 6 is another arrangement to provide similar performance as described by way of the arrangement in Fig. 5. The video signal (in Fig. 6) is applied upon the control grid of charger tube V9, which charges capacitor C6 linearly in series with plate supply potential source B9. The control grid of charger tube V9 is normally biased by the bias source B10. The discharger tube V10 is normally in a state of anode current cut-off by a high negative bias voltage upon its control grid. When discharge of capacitor C6 is desired, a positive pulse is applied upon the control grid of V10, rendering it conductive, and thereby discharging the stored potential across capacitor C6. As described by way of the arrangement given in Fig. 5, the rate of charge across capacitor C6 is dependent upon the instantaneous internal resistance of charger tube V9, as controlled by the instantaneous amplitude of the signal applied upon the control grid of V9.

What I claim is:

1. The system of charging and discharging a capacitor, the system comprising a capacitor; a signal source; means for charging said capacitor in a magnitude of voltage proportional to the magnitude of signal in said source; a steady state voltage source; an electric discharge device having at least an anode, a cathode and a current-intensity control electrode; a current-cut-off bias upon said control electrode for rendering said device normally inoperative; means for coupling the steady state voltage source and said electric discharge device in series with the capacitor, so polarized as to discharge the stored signal in said capacitor in series with last said voltage source when said device is rendered operative; a discharging-signal source and means therefor for applying the discharging-signal in last said source upon the control electrode of said device for operating same, thereby effecting the discharge of said capacitor; a rectifier means having at least an anode and a cathode; and means for coupling the rectifier means to said capacitor, polarized to quiescence during signal-charging of said capacitor, whereby avoiding discharge of said capacitor during charged state, and substantially preventing recharge of said capacitor in reversed polarity through said steady state voltage source during the operation of said electric discharge device by offering forward current in series with last said device.

2. The system as set forth in claim 1, wherein said means for charging said capacitor comprises a signal-controllable variable thermionic-impedance means coupled in series with said capacitor, whereby charging said capacitor at a time rate dependent upon its instantaneous impedance is controlled by said signal source.

References Cited in the file of this patent

UNITED STATES PATENTS

| | | |
|---|---|---|
| 2,579,525 | Varela | Dec. 25, 1951 |
| 2,823,319 | Vossberg | Feb. 11, 1958 |
| 2,836,787 | Seider | May 27, 1958 |